No. 618,710. Patented Jan. 31, 1899.
G. F. MOYERS.
TIRE HEATING DEVICE.
(Application filed Aug. 20, 1898.)
(No Model.)
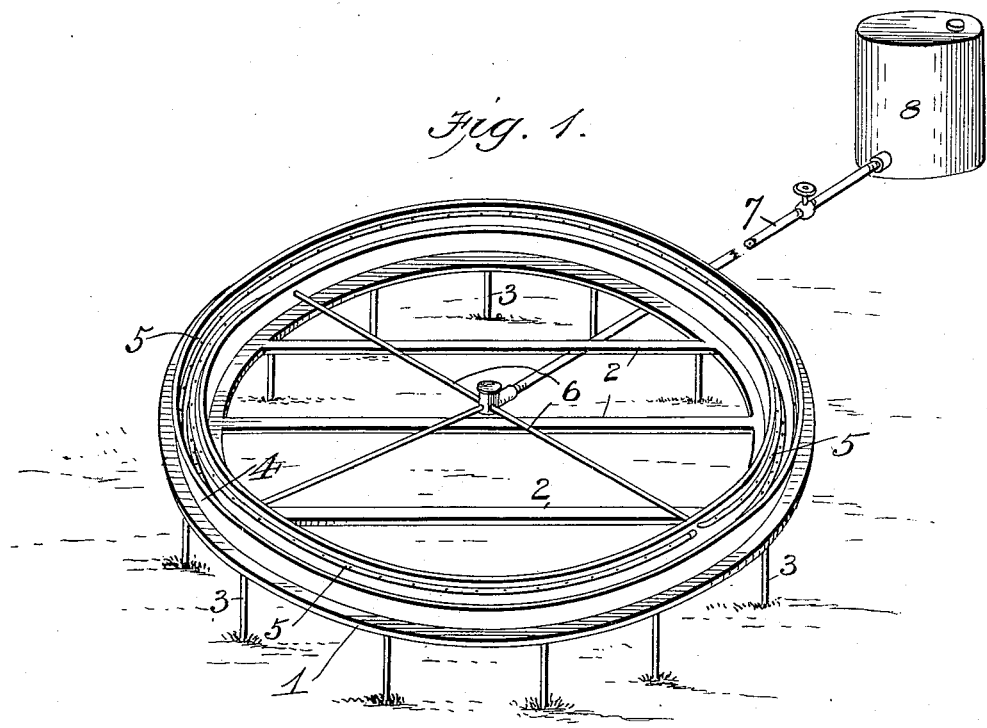
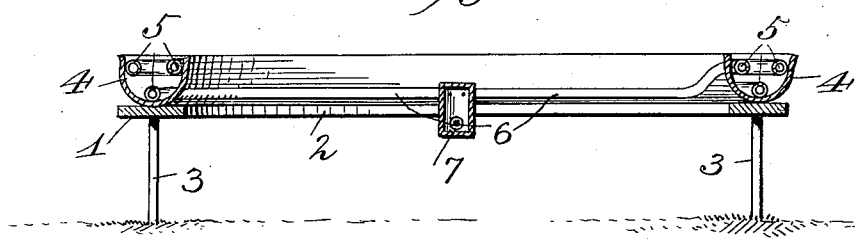
Witnesses: Franck L. Ousand. Jos. L. Coombs.
Inventor: George F. Moyers, by Louis Bagger & Co. Attorneys.

UNITED STATES PATENT OFFICE.

GEORGE FRANKLIN MOYERS, OF OAKVILLE, IOWA.

TIRE-HEATING DEVICE.

SPECIFICATION forming part of Letters Patent No. 618,710, dated January 31, 1899.

Application filed August 20, 1898. Serial No. 689,073. (No model.)

*To all whom it may concern:*

Be it known that I, GEORGE FRANKLIN MOYERS, a citizen of the United States, residing at Oakville, in the county of Louisa and State of Iowa, have invented new and useful Improvements in Tire-Heating Devices, of which the following is a specification.

My invention relates to means for heating tires preparatory to their being shrunk on wheels; and its object is to provide an improved construction of heating device by which the tire is held in a suitable receptacle and heated by means of flame from hydrocarbon or gas burners, whereby the required temperature is imparted to the tire in a rapid and efficient manner.

The invention consists in the novel construction and combination of parts hereinafter fully described and claimed.

In the accompanying drawings, Figure 1 is a perspective view of a tire-heating device constructed in accordance with my invention. Fig. 2 is a sectional view of the same.

In the said drawings the reference-numeral 1 designates a metallic circular plate provided with brace-bars 2 and supported by legs or feet 3, forming a frame to receive a circular trough 4, in which the tire to be heated is placed. This trough is approximately semi-circular or U-shaped in cross-section, and in it are located three circular perforated pipes 5, which constitute the burners. One of these pipes rests on the bottom of the trough, while the other two are located at opposite sides and elevated above the same. Connected with said burner-pipes are radial or transverse pipes 6, the inner ends of which are connected with a central receptacle 9. Connected with this receptacle is a pipe 7, leading to an elevated tank 8, containing gasolene or other liquid hydrocarbon.

The manner of using the device is as follows: The tire to be heated is placed in the trough and gasolene admitted to the burner-pipes and ignited. From the position of these pipes it will be seen that the flame will be directed against the tire from three directions, so as to thoroughly heat the same in a rapid and efficient manner. The said burner-pipes are securely fastened to the trough, and the pipe from the gasolene-tank is provided with a stop-cock for admitting and cutting off the supply at the proper times.

Instead of the elevated tank containing the liquid hydrocarbon the burners may be connected with a gas-supply pipe, if desired.

Having thus fully described my invention, what I claim is—

In a tire-heating device, the combination with the circular frame, the legs and the brace-bars, of the circular trough adapted to receive a tire, the central perforated burner-pipe located on the bottom thereof, and the side perforated burner-pipes located above the same, at opposite sides of the trough, the radial pipes connected with said burner-pipes respectively, the central receptacle with which the inner ends of said radial pipes are connected, the pipe connected with said receptacle, and the elevated oil-tank connected therewith, substantially as described.

In testimony whereof I have hereunto set my hand in presence of two subscribing witnesses.

GEORGE FRANKLIN MOYERS.

Witnesses:
O. C. G. PHILLIPS,
JEREL CARVER.